Patented Apr. 28, 1931

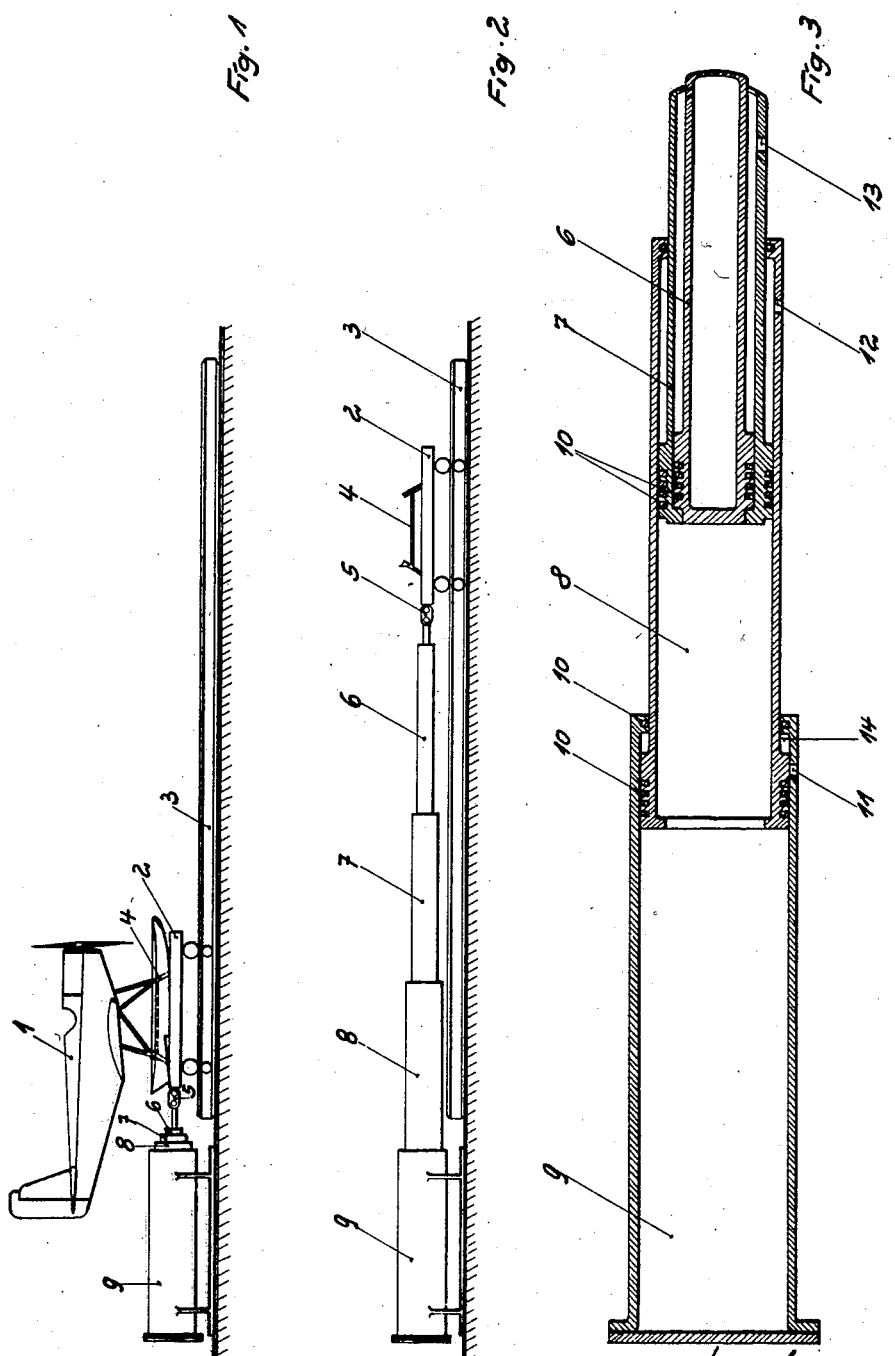

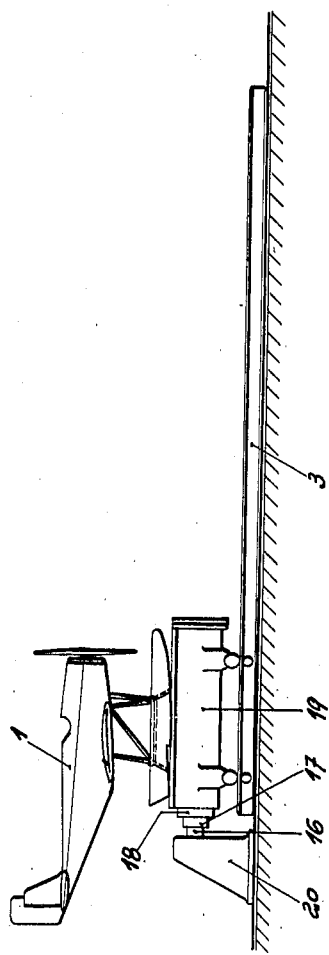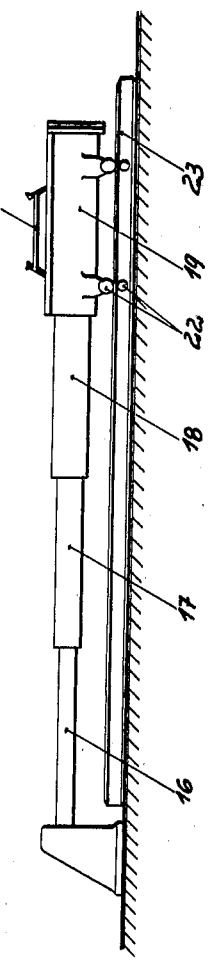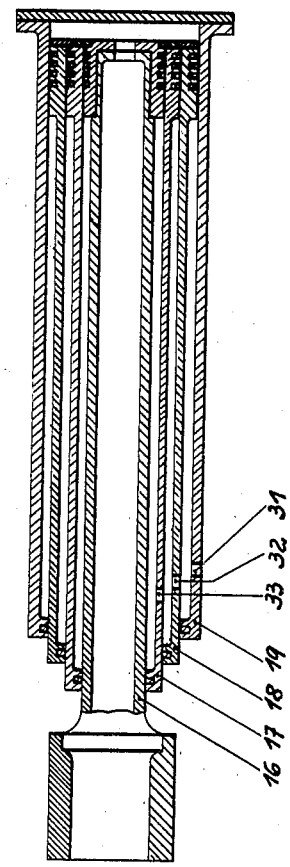

1,802,649

UNITED STATES PATENT OFFICE

ERNST HEINKEL, OF WARNEMUNDE, GERMANY

AIRPLANE-LAUNCHING APPARATUS

Application filed June 6, 1929, Serial No. 368,766, and in Germany March 10, 1927.

The invention relates to the problem of rapidly speeding up aircraft such as motor driven airplanes, motorless gliders and like heavier than air flying machines in the launching operation and more particularly to improvements in auxiliary propelling and launching devices for the purpose set forth comprising a cylinder and a piston cooperatively connected with the aircraft and operated by a compressed fluid such as compressed air or gases rapidly developed by a semi-explosive medium.

In launching apparatus of this character cylinders of such extraordinary dimensions were required viz. of a length substantially equal to that of the launching trackway, that it is in practice almost impossible to build the said cylinders and piston rods strong enough to withstand the extraordinary loads and stresses resulting from their abnormal length.

Other attempts to solve the difficult problem under consideration by means of apparatus having a cylinder of smaller length and greater diameter and in which auxiliary mechanisms are used for gearing up the ratio of speed transmitted by the piston rod were equally unfavourable by reason of the complicated structural nature of said gears and their cooperating elements, because of the extraordinary high loads produced through the accelerating action, and last not least on account of the difficulties to maintain intricately associated mechanism of such complicated design in proper working order especially under adverse conditions often prevailing e. g. on deck of war ships carrying aircraft.

The principal object of my invention is to provide an improved launching apparatus for the purpose concerned, in which the drawbacks outlined above are overcome viz. which is of comparatively small dimensions yet having a great speeding-up capacity and in which complicated gearing up mechanisms interconnecting the aircraft and the piston are eliminated.

Other objects of the invention will incidentally appear hereinafter.

The nature and scope of the invention are briefly outlined in the appended claims and will be more fully understood by the following specification taken together with the accompanying drawing in which:

Figs. 1 and 2 are side elevations diagrammatically showing the launching apparatus by way of an example both in its collapsed and its extended position, Fig. 3 is a cross section longitudinally taken through the telescopingly associated cylinders and being drawn in a larger scale, Figs. 4 and 5 are side elevations diagrammatically showing a structurally modified launching apparatus in its collapsed and extended position respectively,

Fig. 6 is a cross section longitudinally taken through the telescopingly associated cylinders and being drawn in a larger scale.

Referring to Figs. 1–3 the flying machine 1 is carried as usual by a launching car 2, the latter running on a rail track 3, mounted e. g. on deck of a ship, and is held in its place—until it becomes disengaged—by an automatic clamping mechanism, indicated at 4 and being known per se in the act.

The launching car is propelled at 5 by means of a compressed fluid such as air, water or gases developed through rapid combustion of a semi-explosive substance, said fluid or gases entering through an intake—not shown—into a series of movable cylinders 6, 7, 8 telescopingly associated with each other and with a stationary cylinder 9.

It will be apparent from Fig. 3 that at the start of the launching operation the compressed fluid acts with its full propelling power simultaneously upon all the three movable cylinders 6, 7, 8 pushing the latter forward and transmitting their full speed directly to the launching car 2 and the flying machine carried thereon.

In this manner the flying machine, using in addition its own motor and propeller energy in the launching operation, is very effectively launched and accelerated.

The movable cylinders 6, 7, 8 are conveniently furnished with devices for preventing leakage such as packing rings, indicated at 10, means may be provided to advantage for intercepting the living force of the moving cylinders at the end of the launching operation.

In the structural embodiment of the invention shown in the drawing by way of example said means comprise exhaust holes or slots 11, 12, 13 or like communications with the outer atmosphere provided in each of the cylinders 6, 7, 8, 9, each hole or slot cooperating with the enlarged head of the next associated cylinder in the manner shown in fig. 3: Towards the end of the outward stroke of the said cylinders the holes 11, 12, 13 are closed by the respective cylinder heads, an air cushion being formed in the enclosed space indicated at 14, which acts as a buffer, smoothly taking off any shocks that might otherwise occur.

Various changes and modifications in the design of launching apparatus described above and in the assemblage and cooperation of its component parts may suggest themselves to those skilled in the art without substantially deviating from the spirit and the salient ideas of my invention.

In the launching apparatus shown in Figs. 4–6 the innermost cylinder 16 in the series of telescopingly associated cylinders 16, 17, 18, 19 is stationarily fixed to the abutment 20, the outermost cylinder 19 is provided with a platform 21 and wheels 22, so as to serve as launching car for the airplane, running on a rail track 23. The working fluid compressed air or gases is supplied to the apparatus through intake ports (not shown) in the abutment.

Air cushions are automatically formed within the cylinders in substantially the same manner and for the same purpose described above in connection with the apparatus shown in Figs. 1–3, viz. through the pistons or cylinder heads closing exhaust holes 31, 32, 33 in the cylinder walls towards the end of the outwards stroke.

Instead of said exhaust holes valves or like means may be provided for automatically interconnecting towards the end of the outward stroke the interior of the cylinders 16, 17, 18, 19 with the annular spaces enclosed by the respective associated pair of cylinders in order to equalize the pressure within both compartments concerned.

What I claim is:—

1. Launching apparatus for flying machines comprising a series of cylinders mounted for telescopic movement and adapted to be supplied with a fluid under pressure to effect their projection relative to one another, one of the end cylinders of said series having a fixed mounting, a carriage for a flying machine, and a substantially direct connection between said carriage and the other end cylinder of said series whereby the latter cylinder is effective to push said carriage to launch a flying machine carried thereby.

2. Launching apparatus for flying machines comprising a series of cylinders mounted for telescopic movement and adapted to be supplied with a fluid under pressure to effect their projection relative to one another, one of the end cylinders of said series having a fixed mounting, a carriage for a flying machine, and a connection between said carriage and the other end cylinder of said series comprising a link pivotally connected to the carriage and to said last mentioned end cylinder.

3. Launching apparatus for flying machines comprising a track, a carriage for a flying machine mounted on said track for movement therealong, a series of cylinders mounted for telescopic movement and adapted to be supplied with fluid under pressure to effect their projection relative to one another, one of the end cylinders of said series having a fixed mounting, and a connection between the other end cylinder of said series and said carriage whereby projection of said cylinders is effective to push said carriage along said track to launch a flying machine carried by said carriage.

In testimony whereof I affix my signature.

ERNST HEINKEL.